April 25, 1939.  C. ROBERTS  2,155,619

DISPLAY DEVICE

Filed Oct. 26, 1938  3 Sheets-Sheet 1

INVENTOR.
Charles Roberts

April 25, 1939.    C. ROBERTS    2,155,619
DISPLAY DEVICE
Filed Oct. 26, 1938    3 Sheets-Sheet 2
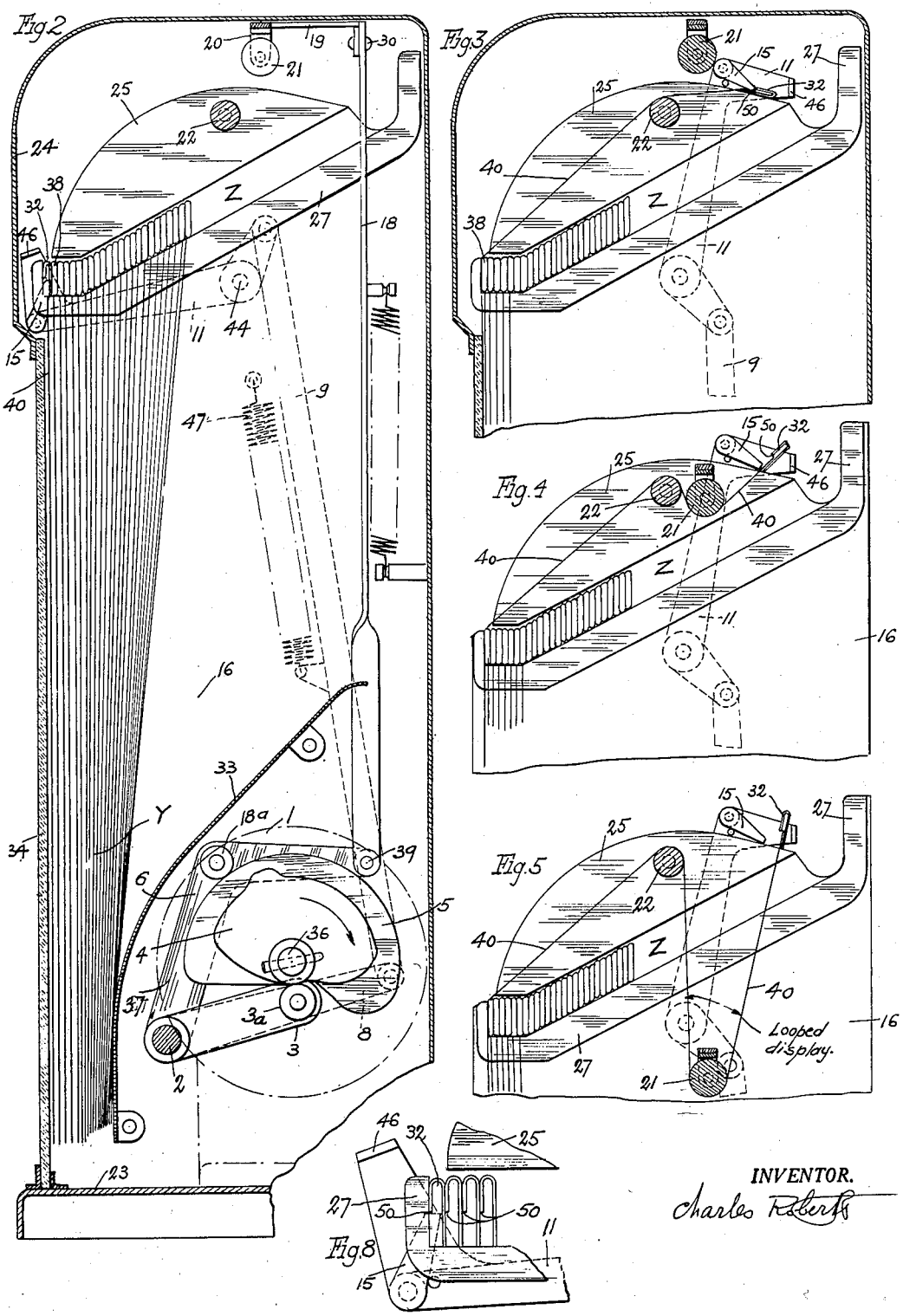
INVENTOR.
Charles Roberts April 25, 1939. C. ROBERTS 2,155,619
DISPLAY DEVICE
Filed Oct. 26, 1938  3 Sheets-Sheet 3
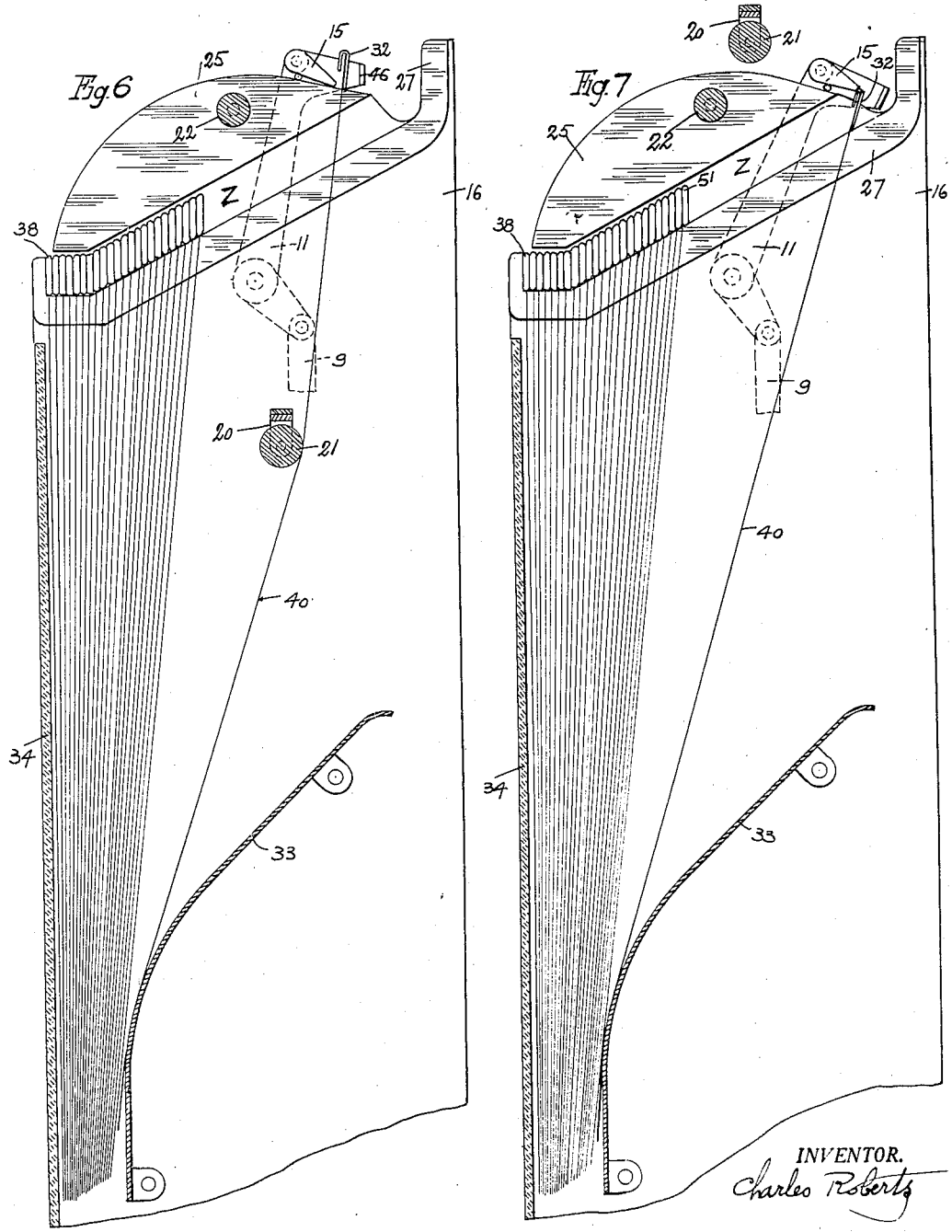
INVENTOR.
Charles Roberts Patented Apr. 25, 1939

2,155,619

UNITED STATES PATENT OFFICE 2,155,619

DISPLAY DEVICE

Charles Roberts, New York, N. Y., assignor, by mesne assignments, to Advertising Machines Corporation, New York, N. Y.

Application October 26, 1938, Serial No. 236,995

12 Claims. (Cl. 40—36)

This invention relates to a display device designed to have, due to its novel movement, eye-compelling powers to attract attention.

Another object of the invention is to produce a display device having a large capacity for displays and which can be manufactured at a relatively low cost due to the inherent simplicity of its mechanism.

This display device will operate with any number of displays placed in its magazine, that is from one to its full capacity. This feature is due to its inclined supports which form the magazine of horizontally compacted displays all of which slide down this incline from the rear to the front of the magazine by gravity as they individually pass through the cycle of the machine.

The basic novelty consists in moving the holder to which the display is attached in an arc, this arc partially elevates the display which has just appeared in the window of the device and this arc also carries the holder to the rear and above all of the holders sustained on the inclined supports of the magazine. While the holder and its display in question is in this position, a depressing arm suddenly contacts the display relatively close to its holder and rapidly flexes the display downward into a loop or fold so that the remainder of the display in question is withdrawn from the display window with startling rapidity to expose the next and succeeding display in the magazine which is already in a registering position therewith. It is to be noted that all the displays in the magazine hang from their holders in a normally vertical position by gravity and are not flexed or curved. This normal position within the magazine prevents them being distorted during periods of high humidity if they were flexed at all therein.

Other objects and details involving the novel co-ordination of movements and structure will be more explicitly developed in the ensuing specification and accompanying drawings, which are to be considered as illustrative only of the theme of my invention.

Referring to the accompanying drawings—

Fig. 2 is a side view in schematic elevation, the side wall of the cabinet as well as the chassis having been cut away to more clearly show the two cams which dictate the entire operative cycle of my invention.

Fig. 3 is a schematic view of the upper portion including the magazine of the device to show together with the succeeding views the movement seriatim which take place in respect to the magazine and to the particular display which is being removed from showing position in the window.

Fig. 4 is the same as Fig. 3 but at a succeeding interval of time to show the display depressing element starting to flex or fold the display downward, which movement starts to rapidly withdraw the display from the window.

Fig. 5 is likewise the same as Fig. 4 but shows the display depressing element in a lower position and the corresponding position assumed by the display in question.

Figure 1:
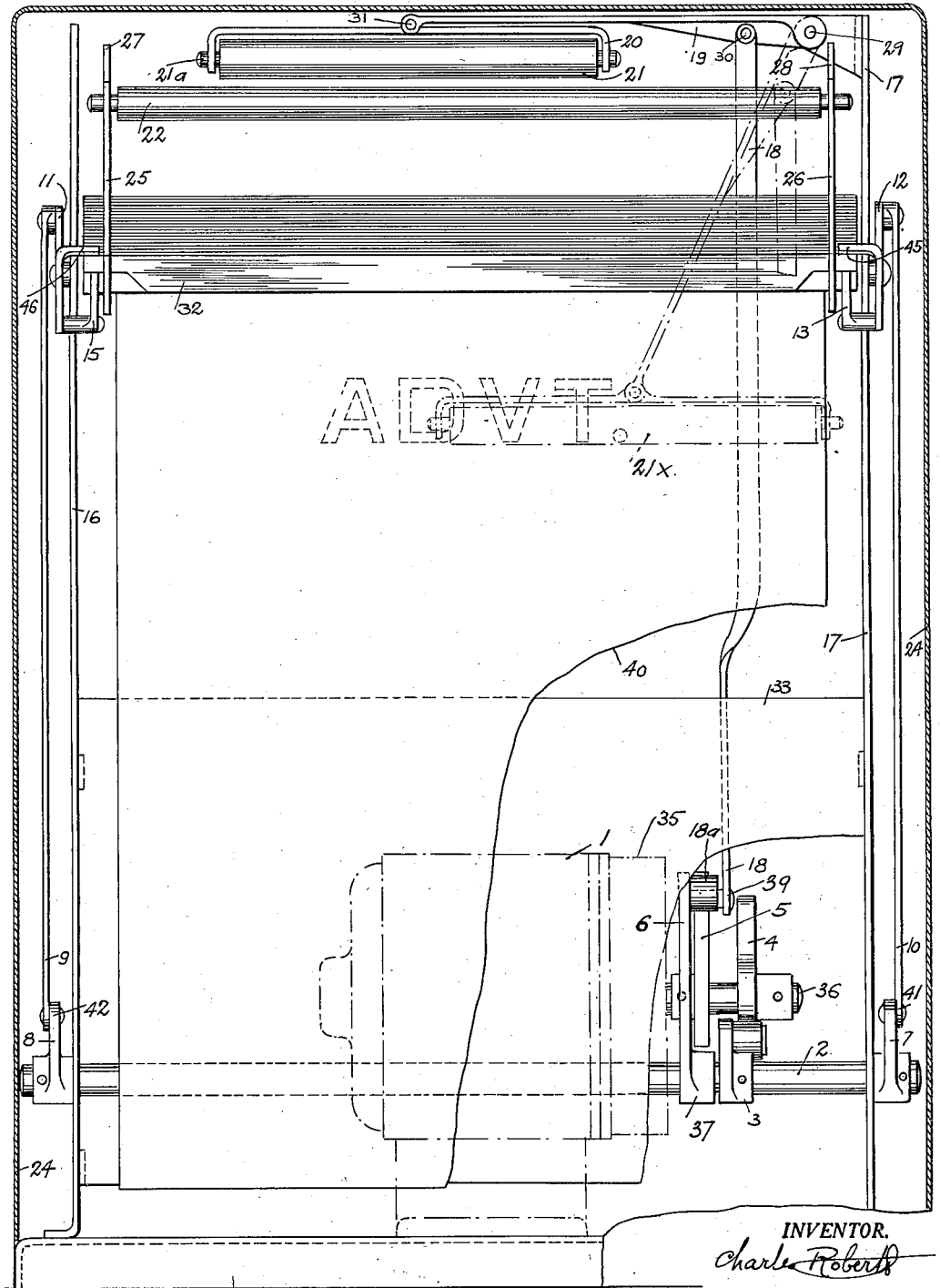
Fig. 1 illustrates my invention in a front elevation wherein the glass window and front of the cabinet has been removed for clarity with the displays in the magazine partially cut away together with the rear paper deflector.

Fig. 6 is likewise a schematic side view in elevation but at a still later period in the cycle to clearly show how the display in question has now entirely slipped down from its folded position as illustrated in Figs. 4 and 5, the free end of the display under the force of the depressing roller together with gravity has fallen into a substantially vertical position behind all the other displays in the magazine.

Fig. 7 shows the holder of the display in question about to leave its supporting arced segments and now free to fall down the empty incline of the magazine.

Fig. 8 is an enlarged fragment in end elevation of the lower front of the magazine to precisely show the free path open to the foremost holder in the magazine as it is about to be carried upward along its arced passage from the front of the magazine to the rear thereof and the latching arrangement involved.

Referring more particularly to the drawings for more detailed description of the operation of my invention in Fig. 1, numeral 1 represents a motor shown in dotted outline together with its gear reduction case 35. Directly on its low speed shaft 36, is suitably secured the cams 4 and 5 respectively. A bent lever 37, fulcrumed on cross shaft 2 and having a roller 18a in contact with the contour of cam 5 is linked to lever 18 by pin 39. Lever 18 is secured by pin 30 to arm 19 fulcrumed at 28 on to a portion of the chassis 17. On the end of arm 19, the roller 21 journaled on shaft 21a which in turn is mounted in yoke 20 and is pivoted at 31 to arm 19. When, by the dictation of cam 5, the roller 18a falls it carries with it the roller 21 by virtue of the above described linkage and its extreme lower position is shown in dotted lines at 20x. The other motor driven cam 4, see Fig. 2, in its rotation moves roller 3a in accordance to its contour. Roller 3a is mounted on link 3 which is rigidly secured to cross shaft 2 by a tapered pin, see Fig. 1 and hence by virtue of cross shaft 2 being journaled in chassis members 16 and 17, the crank arms 7 and 8 fall or rise in unison. These arms in turn connected by pins 41 and 42 to connecting links 9 and 10 which are journaled to bell cranks 11 and 12, see Fig. 2 which are pivoted at the point 44. The longer arm of bell cranks 11 and 12 respectively carry the pawls 15 and 13. Off-set guard arms 45 and 46 form the extremities of the longer arm of ball cranks 12 and 11, see enlarged detail Fig. 8. Referring to Fig. 2 inclined supports 27 together with the spacers, 25 and 26, see Fig. 1, form a pair of aligned slots Z into which are inserted a plurality of display holders, the foremost or lowest in the series being numbered 32 and the next to it numbered 38, see Fig. 2. An idler roller 22, see, Fig. 1, is journaled in the spacers 25 and 26. A spring 47 secured at one end to chassis riser 16 and at the other end to link 9 keeps the roller 3a on cam contour 4. The deflection plate 33 tends to guide the falling end of the displays and keep the lower ends of the compacted displays in the magazine steady. A glass window 34 is sustained by the base 23 and cabinet 24. It is to be noted that no display locking detail is shown of display holder 32 and its series inasmuch as any one of many conventional holders may be used such as those using a spring clamp element or those using a fold in the paper display itself which slides in endwise into a double fold of the metal along the length of the holder to form a secure lock.

Referring more particularly to the exact operation of my invention and starting with the device in position as is indicated in Fig. 2, the holders in the magazine being duly loaded with their respective displays as indicated by the letter Y; cam 4 set into rotation, see arrow, by the starting of electric motor 1 pulls downward on links 9 and 10 due to its particular contour and thereby elevates arms 11 and 12, see Fig. 8, carrying pawls 15 and 13 which have fallen due to their angular suspension or by springs (not shown) into recesses 50 on both ends of display holder 32. As the arms 11 and 12 swing through an arc determined by point 44, the holder 32 is carried thereby up to the position as is illustrated in Fig. 3 with pawl 15 seen to be still in engagement with recess 50 and the display in question as indicated by numeral 40 partially elevated out of register with window 34 and in rolling engagement with roller 22.

At this moment due to the contour of cam 5 depression roller 21, see Fig. 3, starts to drop and in Fig. 4 is seen to have contacted with the display 40 causing it to flex into a fold which deepens as is seen in Fig. 5 as the roller continues to rapidly fall. It is noted that the holder 32 under tension of the paper display 40 has risen up on its edge still supported on both its ends by the members 25 and 26. The cam control 4 has caused the arms 11 and 12 to remain stationary during the interval as illustrated by sequential Figs. 3, 4, 5 and 6. In Fig. 6 the roller 21 has assumed its lowest position and the free lower end of the display 40 has already fallen downward completely out of register with window 34. In Fig. 7 which illustrates the subsequent movement arms 11 and 12 move slightly further along to their extreme position causing holder 32 to fall off of the supporting members 25 and 26 and to slide down the inclined magazine slots Z. However just before this final movement of holder 32 and its display 40 takes place the roller 21 rapidly moves upward again to assume its first position as is seen again in Fig. 7, allowing free passage for holder 32 to compact against holder 51.

The arms 11 and 12 again fall from their position as is seen in Fig. 7 to that shown in Fig. 2 to again engage the next holder in the magazine viz. number 38 and so the action is repeated producing seriatim the display of whatever number of holders with their respective displays may be in the magazine as it is obvious that three, five or any number up to the full capacity of the device can be displayed in regular sequence. The ability of this device to operate with a variable number of display holders is a valuable commercial factor as many installations start with a few displays and later on are necessarily augmented.

The displays with their holders can be likewise easily taken from or inserted into slots Z in the magazine.

It must be particularly noted that the distinctive and contrasting speed of withdrawal of the displays from the window of this device, first slow and then in fact, faster than the eye can possibly follow, produces an illusion of "Now you see it and now you don't". It has been proved by long operation that this contrasting speed does not tear or injure the paper displays but adds to the drawing power of the displays.

What I desire to encompass and protect by United States Letters Patent is set forth in the following claims.

I claim:

1. A display device comprising a display window supported in a chassis, an inclined magazine to sustain a plurality of displays compacted in vertical alignment with said wondow and hanging from holders resting on said inclined magazine, motor driven means to partially withdraw from said window said displays seriatim at a relatively low speed and secondary means to complete said withdrawal at a relatively high speed.

2. A display device comprising a show window, a chassis therefor, a magazine adapted to sustain a plurality of displays therein, motor driven means to partially withdraw from said window said displays seriatim at a relatively low speed and secondary means to complete said withdrawal from said window at a relatively high speed.

3. A display device comprising a display window therefor, a chassis, a magazine supported in said chassis and adapted to sustain a plurality of displays, the foremost display therein in registering position with said window, motor driven means to partially withdraw said foremost display from said window and secondary means to contact said partially withdrawn display to flex it along its length into a loop drawn downward and behind all of the other displays in said magazine.

4. A display device comprising a window therefor, a chassis, a magazine in said chassis to support a plurality of displays, the foremost display therein in registering position with said window, motor driven means to lift the top of said foremost display upward and to the rear of all of said displays in said magazine, and means to flex said display while in said position downward, to completely withdraw said display from said window and permit it to fall behind all of said displays in said magazine.

5. A display device, comprising a display window therefor, a chassis, a magazine in said chassis adapted to sustain a plurality of display holders, displays inserted at their upper ends in said holders and hanging downward in compacted position therefrom, the foremost display in said magazine in registering position with said window, motor driven means to lift the holder of said foremost display upward and to the rear of all of said holders and means to depress said foremost display while in said elevated position downward, looping the display until the free end thereof opposite said holder falls by gravity behind all of said displays in said magazine.

6. A display device comprising a display window therefor a chassis, a magazine in said chassis adapted to sustain a plurality of display holders, displays inserted at their upper ends in said holders and hanging downward in compacted position therefrom, the foremost display in said magazine in registering position with said window, motor driven means to lift the holder of said foremost display upward and to the rear of all of said holders and means to depress said foremost display while in said elevated position downward, looping the display until the free end thereof opposite said holder falls by gravity behind all of said displays in said magazine, and means to release said holder from its elevated position to permit it to fall into the rear of said magazine.

7. A display device comprising a window therefor, a chassis, a magazine in said chassis containing a plurality of displays sustained therein, the nearest display to the window being in register therewith, means to lift the top of the display next to said window upward and to the rear of all of said displays in said magazine, secondary means to depress said partially lifted display while in an extended position, flexing said display into a loop to that extent wherein gravity permits said display to fall in parallelism with all of the other displays in said magazine.

8. A display device, a window therefor, a chassis, a magazine sustaining a plurality of displays, motor driven means to displace out of register of the window each display seriatim contained in the magazine at two distinct speeds of displacements, the first at a relatively low speed and the second at a relatively high speed.

9. A display device comprising a window therefor, a chassis, a magazine in said chassis containing a plurality of displays sustained therein, the nearest display to said window being in register therewith, motive operated means to lift the top of said nearest display upward and to the rear of all of said displays in said magazine together with means to depress said display while in said rear-ward position, flexing said display to that extent wherein said display is forced into substantial parallelism with the displays sustained in said magazine.

10. A display device comprising a window therefor, a chassis, a magazine in said chassis containing a plurality of displays sustained therein, the nearest display to said window being in register therewith, motive operated means to lift the top of said nearest display upward and to the rear of all of said displays in said magazine together with means to depress said display while in said rear-ward position, flexing said display to that extent wherein said display is forced into substantial parallelism with the displays sustained in said magazine, and the translational displacement of said display into coincidence with its initial display position.

11. A display device comprising a display window therefor, a chassis, a magazine in said chassis adapted to contain a plurality of display holders, displays sustained at their upper ends in said holders and hanging downward in compacted position therefrom, the foremost display in said magazine in registering position with said window, motive operated means to lift said foremost holder with its display upward and then to the rear of all of said holders and means to flex said foremost display beyond that portion adjacent to its holder to that extent such that said display is forced into substantial parallelism with the displays in said magazine.

12. A display device comprising a display window therefor, a chassis, a magazine in said chassis adapted to contain a plurality of display holders, displays sustained at their upper ends in said holders and hanging downward in compacted position therefrom, the foremost display in said magazine in registering position with said window, motive operated means to lift said foremost holder with its display upward and then to the rear of all of said holders and means to form a U shaped loop in said display to that extent such that said display is forced into substantial parallelism with the displays in said magazine.

CHAS. ROBERTS.